United States Patent Office 2,769,007
Patented Oct. 30, 1956

2,769,007

MANUFACTURE OF A PYRIDINE HOMOLOGUE

William Randall Bamford, Saltcoats, Scotland, assignor to Imperial Chemical Industries Limited, London, England, a corporation of Great Britain No Drawing. Application July 21, 1955,
Serial No. 523,619

Claims priority, application Great Britain October 4, 1954

16 Claims. (Cl. 260—290)

The present invention is concerned with improvements in or relating to the production of a pyridine homologue and is particularly concerned with improvements in or relating to the production of 5-ethyl-2-methylpyridine.

Early workers have shown that by reacting acetaldehyde and ammonia together 5-ethyl-2-methylpyridine can be produced in admixture with substantial amounts of higher boiling pyridine bases and 2-methylpyridine, the amounts of these by-products depending on the reaction conditions. The reactants may be aldehyde-ammonia alone, aldehyde-ammonia and acetaldehyde, aldehyde-ammonia and paraldehyde, or ammonia and paraldehyde. The yields were always low and the pressures developed were high.

Subsequently it has been shown that when the reaction between paraldehyde and ammonia was carried out in the presence of 0.044 mole of ammonia acetate per mole of paraldehyde and at a temperature of 200° to 250° C. the yield of 5-ethyl-2-methylpyridine increased from 31% when 1.7 times the theoretical amount of ammonia is used to about 70% when 10.7 times the theoretical amount of ammonia is used. It is stated that a yield of 52 to 57% is obtained with a preferred amount of ammonia of 3.7 times the theoretical.

It has also recently been proposed to make 5-ethyl-2-methylpyridine by inter alia charging aqueous ammonia to a pressure vessel, heating the aqueous ammonia to a temperature at which ammonia and acetaldehyde react, slowly introducing acetaldehyde to the vessel, the total amount of acetaldehyde so introduced being less than that theoretically required to react with the ammonia, and maintaining such reaction temperature until the reaction is complete.

The disadvantages of the above mentioned methods are that the pressures developed in the autoclaves may range from 40 to 200 atmospheres. The pressure is usually higher the greater the proportion of aqueous ammonia to paraldehyde. Furthermore the volume of the reaction mixture tends to become inconveniently large as the quantity of ammonia is increased.

The object of the present invention is to provide a process for the production of 5-ethyl-2-methylpyridine from paraldehyde and such ammonium salt as will permit the formation of said pyridine compound in good yields at relatively low pressures.

It has now been found that a reaction can be carried out at relatively low pressures and temperatures between paraldehyde and an excess of an ammonium salt of certain weak acids to give yields of the order of 70% of 5-ethyl-2-methylpyridine. Ammonium salts of weak acids which react with paraldehyde to give 5-ethyl-2-methylpyridine are for instance ammonium borate, ammonium bicarbonate, ammonium citrate, ammonium propionate, ammonium acetate, ammonium tartrate and ammonium phosphate. However, ammonium formate only gives a yield of 15% at 45 atmospheres and ammonium bicarbonate requires 40 atmospheres to give a yield of 66%. Ammonium tartrate only gives a yield of 41% at 15 atmospheres and ammonium citrate requires 50 atmospheres to give a yield of only 4%. On the other hand ammonium acetate, ammonium propionate and ammonium phosphate only require pressures of 13 to 26 atmospheres to give a yield of about 70% 5-ethyl-2-methylpyridine.

According to the present invention the method for the production of 5-ethyl-2-methylpyridine comprises heating under pressure to a temperature of at least 160° C. paraldehyde and an aqueous solution of at least one of the ammonium salts, ammonium acetate, ammonium propionate and triammonium phosphate wherein the molar concentration of the ammonium salt is preferably at least equivalent to 3 moles ammonia for every 4 moles of paraldehyde.

The preferred temperature for the reaction is usually between 180° C. and 210° C., although higher temperatures as for example 250° C. can be used. The pressures developed in the autoclave are usually about 13 to 26 atmospheres. It is also found that the 5-methyl-2-methylpyridine is obtained substantially free from other pyridine bases. With a quantity of the ammonium salt equivalent to 3 moles of ammonia for every 4 moles of paraldehyde the yield is better than that obtained using stoichiometric proportions of ammonia and paraldehyde but it is preferred to use aqueous solutions containing a quantity of the ammonium salt equivalent to at least 6 moles of ammonia for every 4 moles of paraldehyde. There is only a small further increase in yield when the quantity of ammonium salt is increased so as to be equivalent to 12 moles ammonia for every 4 moles of paraldehyde. An advantage of the invention is that the acid liberated from the ammonium salt during the reaction may be subsequently neutralised by the addition of ammonia to the reaction mixture after the reaction is completed to form in solution the ammonium salt used to carry out the reaction. The solution thus formed can be if desired concentrated by evaporation. If free ammonia is used in a quantity exceeding the theoretical amount required it is more difficult to make use of any of the unconsumed ammonia for a further reaction with paraldehyde.

5-ethyl-2-methylpyridine is volatile in steam and so it may be recovered by steam distillation from the reaction mixture after the reaction is over. If, however, the free acid formed from ammonium acetate or ammonium propionate is to be subsequently converted into the ammonium salt it is found usually to be preferable to extract the 5-ethyl-2-methylpyridine from the aqueous reaction mixture with a suitable volatile organic solvent. Preferably the said solvent has a much lower boiling point than the 5-ethyl-2-methylpyridine. Examples of such solvents are chlorinated hydrocarbons, as for instance, chloroform or trichloroethylene, and aromatic hydrocarbons as for instance benzene or toluene. The solvent is separated from the extract as for instance by distillation and the product is purified from tarry impurities by distillation. It is found that it is usually desirable to make the reaction mixture neutral or slightly alkaline by the addition of ammonia before the extraction is carried out with said solvent as the solvent would also extract the free acetic acid or propionic acid and subsequent distillation of the extract would fail to separate the 5-ethyl-2-methylpyridine from the acetic or propionic acid.

With triammonium phosphate the preferred procedure is to add ammonia to the reaction mixture to reform triammonium phosphate from the free phosphoric acid produced and then to extract the 5-ethyl-2-methylpyridine with solvent. After the extraction the aqueous solution is preferably concentrated by evaporation before using it for the production of a further batch of 5-ethyl-2-methylpyridine.

The invention is illustrated by the following examples.

Example 1

88 kg. paraldehyde and a solution of 173 kg. ammonium acetate in 125 litres of water (the molar ratio of ammonium acetate to paraldehyde is 3.375 to 1 and and thus the molar ratio of ammonia to paraldehyde is 3.375 to 1) are introduced into an autoclave provided with stirring means, thermometer and pressure gauge and the autoclave and its contents are heated with agitation to a temperature of 200° C. which takes about two hours. Heating is continued for three hours thereafter at 200° C. The pressure which is developed is about 20 atmospheres. The mixture is cooled, is neutralized with ammonia and is extracted once with 125 litres of chloroform and again with 75 litres of chloroform. The combined extracts are washed with 50 litres of water and the washings are rejected. The separated choloroform extract is distilled at atmospheric pressure until the chloroform is almost all distilled off. The residue is then distilled through a small fractionating column under reduced pressure. The aqueous layer remaining from the choloroform extraction is evaporated to approximately 240 litres under a pressure below 200 mm. and is brought to its original ammonium acetate concentration and pH, namely 7, and is reutilised in the preparation of another batch of 5-ethyl-2-methylpyridine by heating it in the autoclave with another 88 kg. of paraldehyde. The boiling point of the 5-ethyl-2-methylpyridine which is distilled through the fractionating column is 61–63° C. at 15 mm. and 174° C. at 760 mm. In repeating this procedure five times using each time the ammonium acetate solution in which the free acetic acid formed in the preceding reaction is brought back to ammonium acetate the average yield is 65% of the theoretical based on the paraldehyde. The product gives a picrate having a melting point 165° C. which is not depressed when mixed with the picrate formed from 5-ethyl-2-methylpyridine prepared according to Frank, Pilgrim & Riener ("Organic Syntheses," (1950), 30, 41.

Example 2

96 kg. of glacial acetic acid are carefully neutralized to pH 7 with the aid of an indicator paper while cooling with approximately 96 litres of ammonia solution of specific gravity nominally 0.88, thereby forming an ammonium acetate solution occupying about 160 litres. This solution and 105.6 kg. paraldehyde (the molar ratio of ammonium acetate to paraldehyde is 2 to 1 and thus the molar ratio of ammonia to paraldehyde is 2 to 1) are introduced into an autoclave and the mixture thus formed is heated with agitation to 200° C. It takes about 2 hours for this temperature to be reached and the mixture is further heated at this temperature for three hours. When the autoclave has cooled the contents are made faintly alkaline with ammonia and are then extracted in two stages, first with 80 litres trichlorethylene and next with 40 litres trichlorethylene. The extract is washed with 30 litres water. The washed and separated extract is distilled free of trichlorethylene at atmospheric pressure and the residue is distilled under a reduced pressure of about 100 mm. On redistillation under reduced pressure the main fraction of the product consisting of 5-ethyl-2methylpyridine boils at 61–63° C. at 15 to 20 mm. pressure. The yield is 69.5%. The faintly alkaline aqueous residue from the trichlorethylene extraction is reconcentrated and brought to its original ammonium acetate concentration and pH and is reutilised in the preparation of a further batch.

Example 3

A solution of 111 kg. propionic acid in 100 litres of water is neutralised with about 90 litres of ammonia solution of specific gravity 0.88 and the resulting solution of ammonium propionate is heated with 88 kg. paraldehyde (the molar ratio of ammonium propionate to paraldehyde is 2.25 to 1 and so the molar ratio of ammonia to paraldehyde is 2.25 to 1) as described in Example 1. The pressure developed is about 15 atmospheres and the yield of 5-ethyl-2-methyl pyridine obtained is approximately 70% of the theoretical.

Example 4

88 kg. paraldehyde and a solution of 74.5 kg. triammonium phosphate in 100 litres water (the molar ratio of triammonium phosphate to paraldehyde is 0.75 to 1 and so the molar ratio of ammonia to paraldehyde is 2.25 to 1) are introduced into an autoclave provided with stirring means, thermometer and pressure gauge and the contents are heated with agitation to a temperature of 200° C. over a period of about 2 hours. Heating is continued for 3 hours thereafter at 200° C. The pressure which is developed is about 15 atmospheres. The mixture is cooled, is neutralised with ammonia and is extracted with 125 litres of chloroform and again with 75 litres of chloroform. The combined extracts are washed with 50 litres of water and the washings are rejected. The separate chloroform extract is distilled at atmospheric pressure until the chloroform is almost completely distilled off. The residue is then distilled through a small fractionating column under reduced pressure. The yield of 5-ethyl-2-methylpyridine obtained is approximately 68% of the theoretical.

What I claim is:

1. A method for the production of 5-ethyl-2-methylpyridine which comprises heating under pressure to a temperature of at least 160° C., and in the substantial absence of added free ammonia, paraldehyde and an aqueous solution of at least one ammonium salt selected from the group consisting of ammonium acetate, ammonium propionate, and triammonium phosphate wherein the molar concentrate of said ammonium salt is at least equivalent to 3 moles of ammonia for every 4 moles of paraldehyde.

2. A method for the production of 5-ethyl-2-methyl pyridine which comprises heating at a temperature of about 180 to 210° C., at a pressure of about 13 to 26 atmospheres, and in the substantial absence of added free ammonia, paraldehyde and an aqueous solution comprising at least one ammonium salt selected from the group consisting of ammonium acetate, ammonium propionate and triammonium phosphate and thereafter recovering from the resulting reaction mixture, wherein the molar concentration of said ammonium salts is at least equivalent to 3 moles of ammonia for every 4 moles of said paraldehyde, said 5-ethyl-2-methyl pyridine.

3. A method as claimed in claim 1 wherein the molar concentration of the ammonium salt is equivalent to at least 6 moles ammonia for every 4 moles of paraldehyde.

4. A method as claimed in claim 1 wherein the temperature is between 180° and 210° C.

5. A method as claimed in claim 1 wherein the acid liberated from the ammonium salt during the reaction is subsequently neutralised by the addition of ammonia to the reaction mixture after the reaction is completed.

6. A process as claimed in claim 5 wherein the solution thus formed is concentrated by evaporation.

7. A method as claimed in claim 1 wherein the 5-ethyl-2-methylpyridine is recovered from the reaction mixture by steam distillation.

8. A method as claimed in claim 1 wherein the 5-ethyl-2-methylpyridine is extracted from the aqueous reaction mixture with a suitable volatile organic solvent after reforming said ammonium salt from the free acid produced.

9. A method as claimed in claim 8 wherein said solvent has a lower boiling point than 5-ethyl-2-methylpyridine.

10. A method as claimed in claim 8 wherein said solvent is selected from the group consisting of chlorinated hydrocarbons and aromatic hydrocarbons.

11. A method as claimed in claim 1 wherein with triammonium phosphate, ammonia is added to the reaction mixture at the end of the reaction to reform triammonium phosphate from the free phosphoric acid produced and the 5-ethyl-2-methylpyridine is then extracted with solvent.

12. A method as claimed in claim 11 wherein after the extraction the aqueous solution is concentrated by evaporation before using it for the production of a further batch of 5-ethyl-2-methylpyridine.

13. A method as claimed in claim 10 wherein said solvent is chloroform.

14. A method as claimed in claim 10 wherein said solvent is trichloroethylene.

15. A method as claimed in claim 10 wherein said solvent is benzene.

16. A method as claimed in claim 10 wherein said solvent is toluene.

References Cited in the file of this patent

UNITED STATES PATENTS

| 2,717,897 | Dunn | Sept. 13, 1955 |

FOREIGN PATENTS

| 147,000 | Great Britain | Mar. 17, 1921 |
| 521,891 | France | July 21, 1921 |